(12) United States Patent
Sakamoto (10) Patent No.: US 9,205,749 B2
(45) Date of Patent: Dec. 8, 2015

(54) ELECTRIC VEHICLE

(75) Inventor: Yusuke Sakamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/397,796

(22) PCT Filed: May 8, 2012

(86) PCT No.: PCT/JP2012/061735
§ 371 (c)(1),
(2), (4) Date: Oct. 29, 2014

(87) PCT Pub. No.: WO2013/168227
PCT Pub. Date: Nov. 14, 2013

(65) Prior Publication Data
US 2015/0107920 A1     Apr. 23, 2015

(51) Int. Cl.
| | |
|---|---|
| B60K 1/00 | (2006.01) |
| B60L 11/18 | (2006.01) |
| B60K 6/40 | (2007.10) |
| B60L 7/14 | (2006.01) |
| B60L 11/12 | (2006.01) |

(Continued)

(52) U.S. Cl.
CPC ............ *B60L 11/1803* (2013.01); *B60K 1/00* (2013.01); *B60K 1/04* (2013.01); *B60K 6/40* (2013.01); *B60L 3/003* (2013.01); *B60L 3/0007* (2013.01); *B60L 7/14* (2013.01); *B60L 11/123* (2013.01); *B60L 11/14* (2013.01); *B60L 11/1868* (2013.01); *B60L 11/1877* (2013.01); *B60L 15/20* (2013.01); *B60L 15/2009* (2013.01); *B60K 2001/0411* (2013.01); *B60L 2210/40* (2013.01); *B60L 2240/423* (2013.01); *B60L 2240/443* (2013.01); *B60L 2240/80* (2013.01); *B60Y 2400/61* (2013.01); *Y02T 10/6217* (2013.01); *Y02T 10/7005* (2013.01); *Y02T 10/7066* (2013.01); *Y02T 10/7241* (2013.01); *Y10S 903/951* (2013.01)

(58) Field of Classification Search
CPC ................................................ B60K 2001/0411
USPC .................................................. 180/232, 68.5
See application file for complete search history.

(56) References Cited

U.S. PATENT DOCUMENTS 5,476,151 A * 12/1995 Tsuchida et al. ............... 180/274
5,643,693 A *  7/1997 Hill et al. ....................... 429/121

(Continued)

FOREIGN PATENT DOCUMENTS

| JP | A-2000-102221 | 4/2000 |
|---|---|---|
| JP | A-2004-328870 | 11/2004 |

(Continued)

*Primary Examiner* — Jeffrey J Restifo
(74) *Attorney, Agent, or Firm* — Oliff PLC (57) ABSTRACT

A structure is provided in which a power cable connecting an inverter with a motor arranged in the front compartment is protected from breakage upon a crash. A hybrid vehicle includes an inverter fixed to a top of a drive train with a gap by front and rear brackets. The front bracket connects a front surface of the inverter with the drive train and the rear bracket connects a rear surface of the inverter with the drive train. The front surface of the inverter corresponds to a frontward side surface of the vehicle. When the vehicle crashes, the front and rear brackets cause the inverter move backward and downward so that a distance between the inverter and the drive train is reduced. Therefore, a power cable is protected from breakage.

8 Claims, 6 Drawing Sheets

(51) Int. Cl.
  *B60L 11/14* (2006.01)
  *B60L 3/00* (2006.01)
  *B60L 15/20* (2006.01)
  *B60K 1/04* (2006.01)

(56) References Cited

U.S. PATENT DOCUMENTS

| | | | | |
|---|---|---|---|---|
| 5,645,448 | A * | 7/1997 | Hill | 439/522 |
| 6,371,229 | B1 * | 4/2002 | Kakiuchi | 180/65.25 |
| 6,827,168 | B2 * | 12/2004 | Miyazaki | 180/68.5 |
| 7,717,207 | B2 * | 5/2010 | Watanabe et al. | 180/68.5 |
| 7,802,643 | B2 * | 9/2010 | Yajima | 180/65.22 |
| 8,011,467 | B2 * | 9/2011 | Asao et al. | 180/68.5 |
| 8,596,397 | B2 * | 12/2013 | Sakamoto | 180/68.5 |
| 8,720,627 | B2 * | 5/2014 | Suzuki et al. | 180/68.5 |
| 8,813,896 | B2 * | 8/2014 | Littlefield et al. | 180/274 |
| 8,893,843 | B2 * | 11/2014 | Hayano | 180/232 |
| 2004/0211613 | A1 * | 10/2004 | Asao et al. | 180/291 |
| 2005/0205316 | A1 * | 9/2005 | Yamafuji | 180/68.5 |
| 2007/0114083 | A1 * | 5/2007 | Asao et al. | 180/68.5 |
| 2007/0115707 | A1 * | 5/2007 | Koide | 363/146 |
| 2010/0101885 | A1 * | 4/2010 | Nozaki et al. | 180/232 |
| 2013/0037335 | A1 * | 2/2013 | Sakamoto | 180/65.8 |
| 2013/0307330 | A1 * | 11/2013 | Hotta et al. | 307/10.1 |
| 2014/0345960 | A1 * | 11/2014 | Yamanaka et al. | 180/65.8 |
| 2015/0021114 | A1 * | 1/2015 | Hotta et al. | 180/279 |
| 2015/0027796 | A1 * | 1/2015 | Naito et al. | 180/65.31 |
| 2015/0083507 | A1 * | 3/2015 | Keller et al. | 180/68.5 |

FOREIGN PATENT DOCUMENTS

| | | |
|---|---|---|
| JP | A-2006-88871 | 4/2006 |
| JP | A-2006-121825 | 5/2006 |
| JP | A-2010-852 | 1/2010 |
| JP | A-2011-20628 | 2/2011 |
| JP | A-2011-84198 | 4/2011 |
| JP | A-2013-193634 | 9/2013 |

* cited by examiner

ELECTRIC VEHICLE

TECHNICAL FIELD

A technology disclosed herein relates to an electric vehicle. The electric vehicle herein includes a hybrid vehicle comprising both a motor and an engine and a fuel-cell vehicle.

BACKGROUND ART

An electric vehicle includes a traction motor and an inverter configured to supply electric power to the motor. Since the traction motor has great rated power, a large current flows from the inverter to the motor. Therefore, it is preferable that the inverter be placed near the motor and that a cable (hereinafter referred to as "power cable") which connects the inverter and the motor be short. For example, in order to shorten the power cable, fixing an inverter to rear or top of a motor is proposed in Japanese Patent Application Publication No. 2004-328870 (Patent Literature 1).

In order to place an inverter near a motor, the motor and the inverter are installed in an engine room. In most automobiles, the engine room is located in a front part of a vehicle. The engine room in the front part of the vehicle is sometimes called a front compartment. In this specification also, the engine room in the front part of the vehicle is hereinafter referred to as "front compartment". There is a risk that a device placed in the front compartment may be damaged when the vehicle crashes. Even when the device is damaged, the vehicle may still be able to run in some cases if there is no breakage in the power cable. Therefore, a structure in which the power cable is protected from breakage is desirable even in the case where the vehicle is in a crash.

One of causes of the power cable breakage at the time of a crash is that the motor and/or the inverter moves backward and a distance between the motor and the inverter is increased by an impact of the crash. In this regard, an example of a structure in which the distance between a motor and an inverter is hardly increased at the time of a crash is disclosed in Japanese Patent Application Publication No. 2006-088871 A (Patent Literature 2). The technology disclosed in Patent Literature 2 is as follows: The inverter is fixed on a side member of a front compartment, and the motor is fixed on a suspension member located below the side member. The side member and the suspension member correspond to a vehicle body frame. The side member and the suspension member are both designed to bend toward a lower side of the vehicle when the vehicle crashes. Bending of the side member and the suspension member in the same direction prevents positions of the inverter and the motor relative to each other from changing at a great degree and reduces a possibility of the power cable breakage.

SUMMARY OF INVENTION

The technology described in Patent Literature 2 fixes the inverter and the motor to different members (namely to the side member and to the suspension member). If a deformation of the side member and a deformation of the suspension at the time of the crash are different, there is a risk that the distance between the inverter and the motor may be increased and the power cable is broken. Further, the technology of Patent Literature 2 makes it necessary to separately determine a fixing position of the inverter and a fixing position of the motor. This means low design flexibility. The present specification provides a structure in which a power cable is protected from breakage at the time of a crash by a different approach from Patent Literature 2.

The technology disclosed herein relates to a placement of a drive train in a front compartment of an electric vehicle and of an inverter configured to supply the motor with AC power. The drive train is a structure housing a traction motor. The technology disclosed herein uses a front bracket and a rear bracket to fix the inverter on a top of the drive train with a gap provided therebetween. The front bracket connects a front surface of the inverter with the drive train, and the rear bracket connects a rear surface of the inverter with the drive train. It should be noted here that the front surface of the inverter corresponds to a frontward side surface of the vehicle, and the rear surface of the inverter corresponds to a rearward side surface of the vehicle. A power cable is a cable routed between the inverter and the drive train, and through this cable, electric power is supplied from the inverter to the motor.

According to the above structure, when the vehicle crashes with an obstacle and the front surface of the inverter receives the impact, the front and rear brackets deform so that the inverter sinks in the gap while moving backward. The deformation of the front and rear brackets buffers the impact while the inverter and the drive train move toward each other. Therefore, in the above structure, the possibility of a power cable breakage is low.

As a further improvement to the above structure, it is preferable that the front bracket has a wavy shape between a fixing point on a drive train side and a fixing point on an inverter side as seen along a lateral direction of the vehicle. The wavy shape of the front bracket makes a movable distance of a forward part of the inverter be longer at the time of receiving impact from the front. This configuration makes it possible to absorb greater amount of the impact.

It should be noted that the above-mentioned Patent Literature 1 discloses a technology of fixing an inverter onto a motor by using a bracket. However, in the technology of Patent Literature 1, the inverter is fixed to the motor located directly below the center of the inverter. Therefore, there is a high possibility that the bracket breaks and the inverter comes off from the motor when impact is applied thereto from a front of the inverter. In the above structure disclosed herein, since the front and rear surfaces of the inverter are fixed by the brackets, the possibility of the bracket breaking and thereby causing the inverter to come off is low. Further, in the structure disclosed in Patent Literature 1, the power cable extends from a rear surface of the inverter, and in the structure disclosed in Patent Literature 2, the power cable extends from a front surface of the inverter. In a case where the power cable extends from the rear surface of the inverter, there is a risk that the power cable may break by being caught between the inverter and another device when the inverter moves backward at the time of the crash. In a case where the power cable extends from the front surface of the inverter, there is a risk that the power cable may break by being caught between a device in front of the inverter and the inverter at the time of the crash.

Details of the technology disclosed herein and further developments thereof are described in an embodiment of the invention.

DESCRIPTION OF EMBODIMENTS

Figure 1:
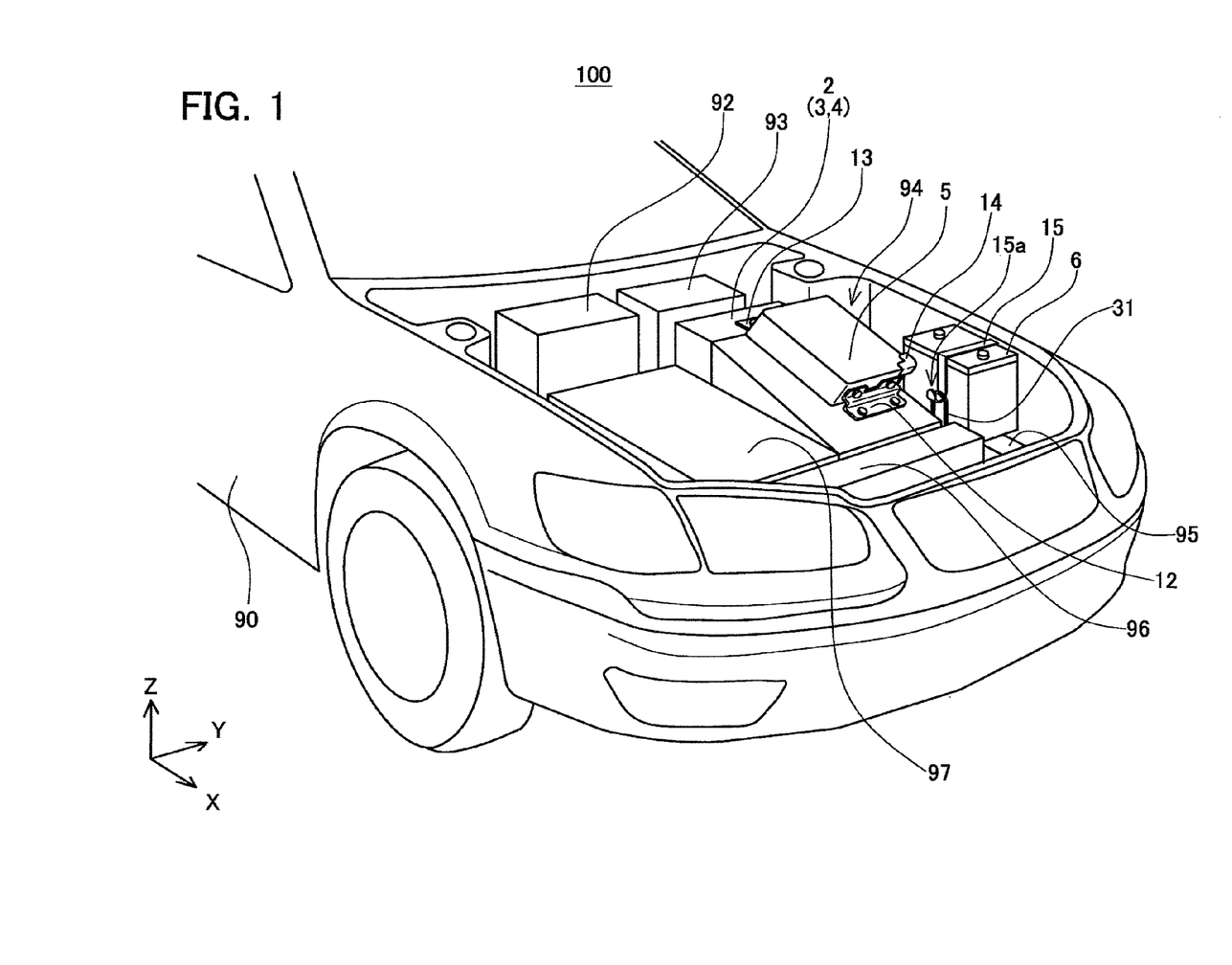
FIG. 1 is a perspective view showing device arrangement in a front compartment of a hybrid vehicle according to an embodiment.
Figure 2:
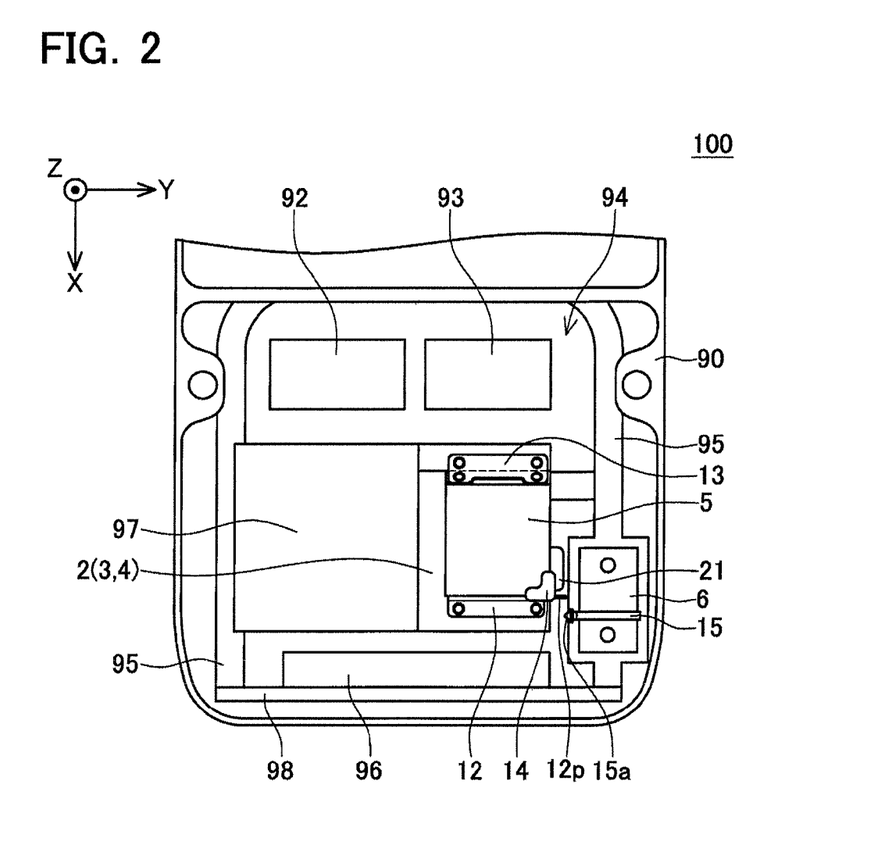
FIG. 2 is a plan view showing the placement of the devices in the front compartment.

An electric vehicle of an embodiment is described with reference to the drawings. The electric vehicle of the embodiment is a hybrid vehicle including an engine and a traction motor. FIG. 1 and FIG. 2 show a layout of devices in a front compartment 94 of a hybrid vehicle 100. FIG. 1 is a perspective view of the front compartment 94, and FIG. 2 is a plan view of the front compartment 94. It should be noted that in FIG. 1 and FIG. 2, shapes of the devices in the front compartment 94 are shown in a simplified manner. Further, in the drawings, an x axis corresponds to a frontward direction of the vehicle, a y axis corresponds to a lateral direction of the vehicle, and a z axis corresponds to an upward direction of the vehicle.

Main devices mounted in the front compartment 94 are an engine 97, a drive train 2, an auxiliary battery 6, a radiator 96, and an inverter 5 configured to supply a motor 3 with AC power. Among other devices, a reference sign 92 refers to a relay box, and a reference sign 93 refers to a compressor of an air conditioner. The first motor 3, a second motor 4, a transmission, and a differential gear are housed in the drive train 2. The first motor 3 and the second motor 4 are configured to drive the wheels. The transmission is configured to amplify output torques of the motors and of the engine. Therefore, it should be noted that the motors 3 and 4 are out of immediate sight in FIGS. 1 and 2.

The engine 97 and the drive train 2 are fixed to a side frame 95 (side member) configuring a frame of a chassis. The radiator 96 is fixed to a front frame 98 (front bumper reinforcement) configuring a part of the frame. A body 90 of the vehicle, too, is supported by the side frame 95 and the front frame 98.

As is well known, the hybrid vehicle switches between using the engine 97 and using the motor 3 or 4, depending on a situation. In a case where great driving force is required, the hybrid vehicle uses the engine 97 and the two motors 3 and 4 as a driving source simultaneously. Otherwise, at least one of the motors is used as a generator for generating electric power. The transmission inside the drive train 2 switches between output from the engine 97 and output from the motor 3 or 4, or combines the outputs and transmits them to the differential gear. The transmission may transmit part of driving force of the engine 97 to the motor 3 or 4. In that case, the motor generates electricity by the driving force of the engine. That is, at least one of the two motors 3 and 4 functions also as a generator. The drive train 2 may be called a power train or a transaxle. A detailed structure of the drive train 2 is not described. The motor 3 or 4 may convert deceleration energy (regenerated energy) into electric energy when a brake is operated.

As will be mentioned later, the drive train 2 is a transaxle, commonly known as a multi-shaft type, for use in a hybrid vehicle. This drive train 2 contains two motors (or motor generators) and a differential gear. Main shafts of the two motors and a shaft of the differential gear extend in parallel with each other. Further, an upper surface of the drive train 2 leans forward. The inverter 5 is fixed to the forward-leaning upper surface. The inverter 5 is fixed to the upper surface of the drive train 2 with a gap by a front bracket 12 and a rear bracket 13. A connector 21 for cables (power cables) configured to supply the motors with AC power is attached on a lateral side surface in a lateral direction of the inverter 5. Since the hybrid vehicle 100 includes the two three-phase drive motors 3 and 4, six power cables (UVW×two sets) extend from the inverter 5.

The auxiliary battery 6 is located at a left front of the inverter 5. The auxiliary battery 6 supplies low-power devices such as a car audio system and a room lamp with electric power. Although not illustrated, a high-output main battery for the traction motors 3 and 4 is housed under a rear seat or in a rear compartment.

A corner protector 14 is attached to a left upper corner portion of the inverter 5 that faces the auxiliary battery 6. At the time of a crash, an obstacle may collide with the auxiliary battery 6 and the auxiliary battery 6 may move backward toward the inverter 5. The corner protector 14 protects the inverter 5 from the auxiliary battery 6 at the time of the crash.

The auxiliary battery 6 is fixed to the side frame 95 by a metal fitting 15 and a rubber belt 31. The metal fitting 15 surrounds lateral sides of the auxiliary battery 6 and an upper side of the auxiliary battery 6 and the auxiliary battery 6 is fixed by hanging the rubber belt 31 being stretched from below on a hook 15a which is a tip of the metal fitting 15. As will be described in detail later, a protector 12p extends laterally from the front bracket 12 in order to protect the power cables from the hook 15a when the auxiliary battery 6 moves backward at the time of the crash.

Figure 3:
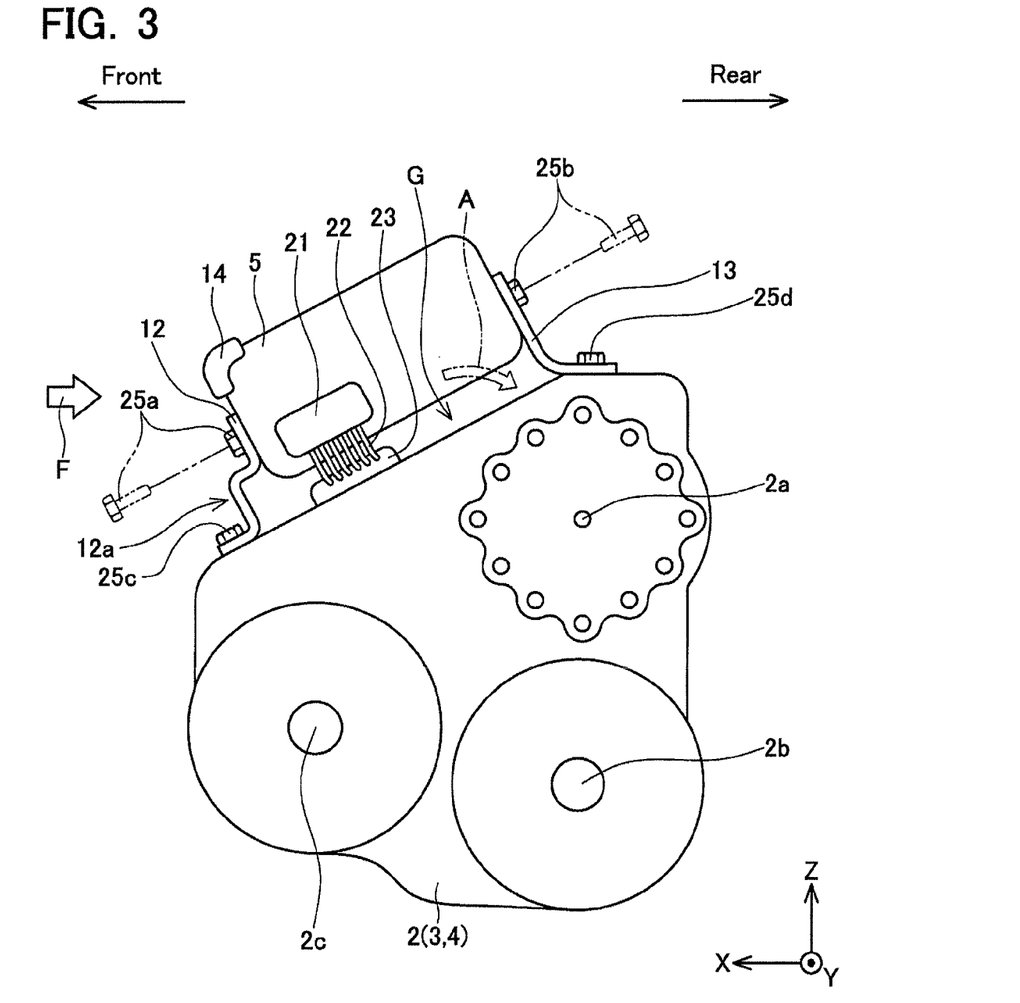
FIG. 3 is a side view of a drive train and an inverter fixed to a top of the drive train.
Figure 4:
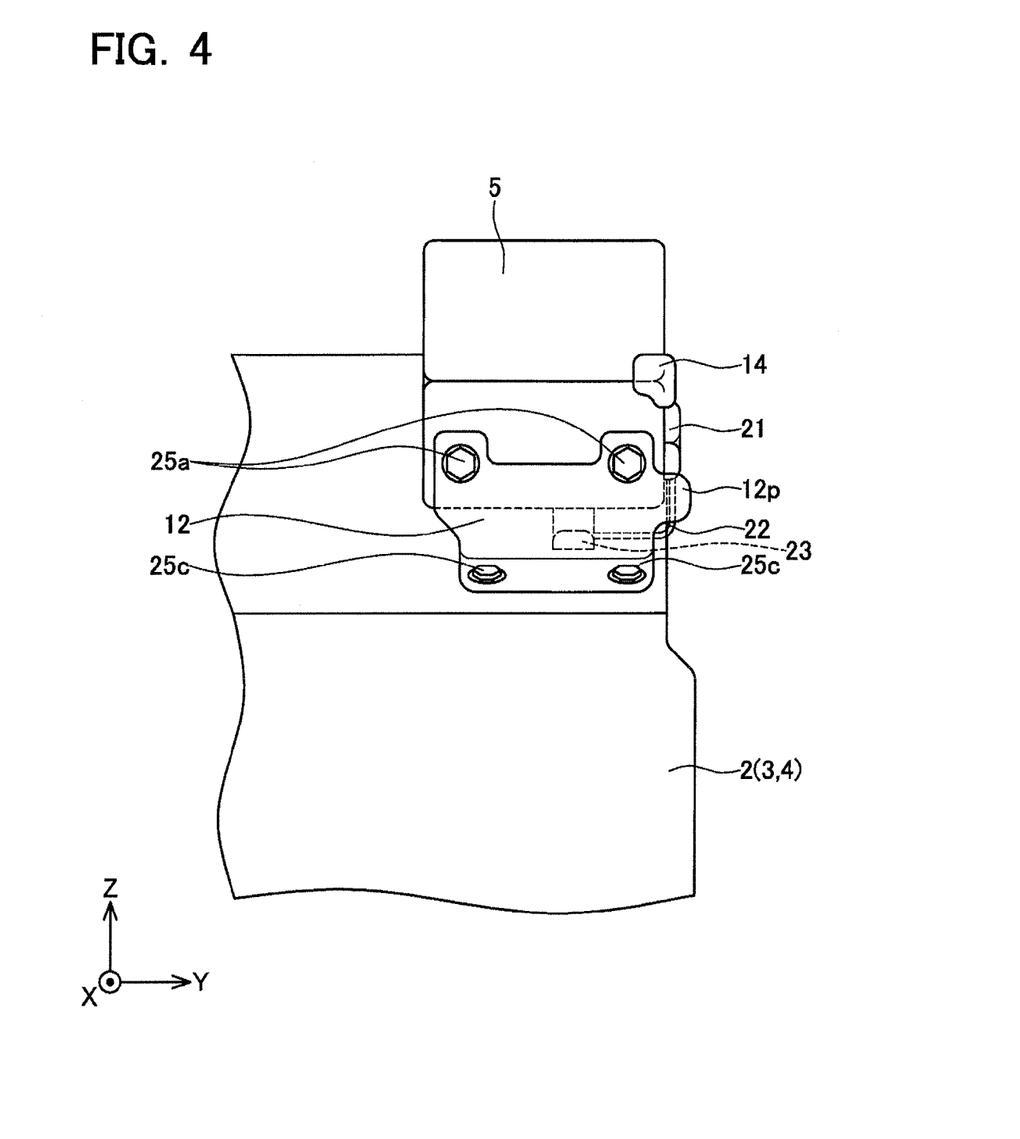
FIG. 4 is a front view of the inverter fixed to the top of the drive train.
Figure 5:
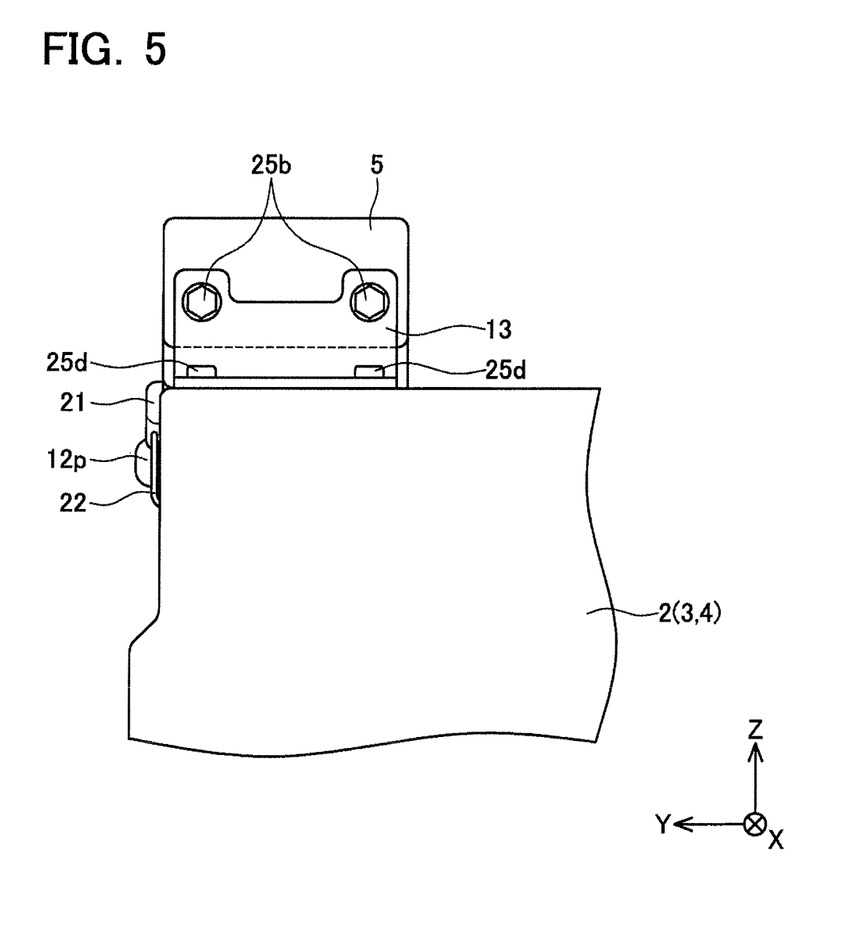
FIG. 5 is a rear view of the inverter fixed to the top of the drive train.

A structure for fixing the inverter 5 is described in detail. FIG. 3 shows a side view of the drive train 2 and the inverter 5 fixed to a top of the drive train 2. FIG. 4 shows a front view of the inverter 5 fixed to the top of the drive train 2, and FIG. 5 shows a rear view of the inverter 5 fixed to the top of the drive train 2. It should be noted that to facilitate understanding, FIG. 3 omits to illustrate the protector 12p. As mentioned above, the drive train 2 is a multi-shaft type in which main shafts 2a and 2b of the two motors 3 and 4 and a shaft 2c of the differential gear extend parallel to each other in the lateral direction of the vehicle. The upper surface of the drive train 2 leans forward. The inverter 5 is fixed by the front bracket 12 and the rear bracket 13 to the forward-leaning upper surface. The front bracket 12 and the rear bracket 13 are made, for example, of iron. The front bracket 12 fixes the front surface of the inverter 5 and the rear bracket 13 fixes the rear surface of the inverter 5. The inverter 5, too, is fixed in such a manner as to lean forward. The front bracket 12 has two fixing points, one on the right and the other on the left on a drive train side, and is fixed by bolts 25c at these two fixing points, respectively. The front bracket 12 also has two more fixing points, one on the right and the other on the left on an inverter side, and is fixed by bolts 25a at these two fixing points, respectively. The rear bracket 13 has two fixing points, one on the right and the other on the left on the drive train side, and is fixed by bolts 25d at these two fixing points, respectively. The rear bracket 13 also has two more fixing points, one on the right and the other on the left on the inverter side, and is fixed by bolts 25b at these two fixing points, respectively. As indicated by virtual lines in FIG. 3, the bolts 25a and the bolts 25b, fixing the inverter 5, extend along a front and rear direction of the vehicle. It should be noted that "faced along a front and rear direction of the vehicle" needs only to mean extending substantially along the front and rear direction of the vehicle.

Strictly speaking, the bolts 25a and 25b are screwed into the inverter 5 at a same angle as an angle at which the inverter 5 leans forward.

As indicated by a reference sign 12a in FIG. 3, the front bracket 12 has a wavy shape between the fixing points on the drive train side and the fixing points on the inverter side as seen along a lateral direction of the vehicle.

One connector 21 for one side of power cables 22 is attached to a side surface of the inverter 5 in the lateral direction of the vehicle. Another connector 23 for the other side of the power cables 22 is attached to the leaning upper surface of the drive train 2. The connector 23 is located directly below the inverter 5. In other words, the power cables 22 configured to supply the motors 3 and 4 with electric power extend from the side surface of the inverter in the lateral direction of the vehicle and are connected to the upper surface of the drive train 2.

A gap G is provided between the upper surface of the drive train 2 and a lower surface of the inverter 5. A configuration of the front bracket 12, the rear bracket 13, and the gap G lowers a possibility of any of the power cables 22 breaking when the vehicle crashes. A reference sign F in FIG. 3 represents impact that is applied to the inverter 5 when the vehicle crashes. When the impact indicated by the reference sign F is applied to a forward part of the inverter 5, the front bracket 12 and the rear bracket 13 fall backward and the inverter 5 sinks in the gap G while moving backward. That is, the inverter 5 moves backward and downward when the inverter 5 receives the impact from the forward part. An arrow A in FIG. 3 indicates the movement of the inverter 5. Deformations of the front bracket 12 and the rear bracket 13 and the movement of the inverter 5 alleviate the impact. Furthermore, the inverter 5 approaches toward the upper surface of the drive train 2 when the inverter 5 moves in a direction indicated by the arrow A. That is, a distance between the connector 21 and the connector 23 is reduced. Therefore, a risk of a breakage in any of the power cables 22 at the time of the crash is low.

Further, as indicated by the reference sign 12a in FIG. 3, the front bracket 12 has a wavy shape as seen from the lateral side of the vehicle. When the vehicle is in the crash, the wavy portion stretches out to allow the front part of the inverter 5 to move over a longer distance. When the moving distance of the inverter 5 becomes longer, it is further possible to alleviate the impact of the crash. The wavy portion 12a of the front bracket 12, too, contributes to the alleviation of the impact of the crash.

Figure 6:
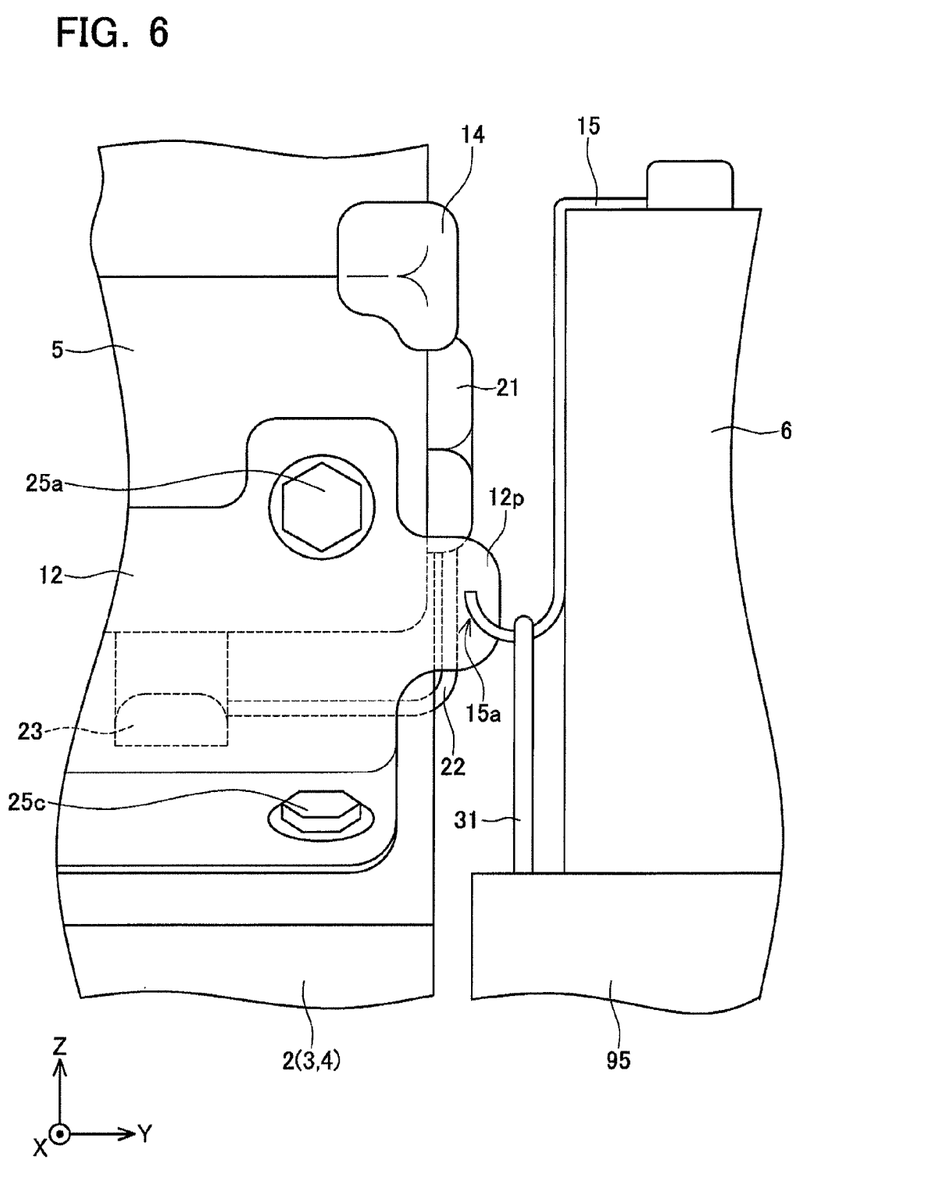
FIG. 6 is an enlarged front view of a protector and an area therearound.

The front bracket 12 has the protector 12p which extends laterally. A function of the protector 12p is described with reference to FIG. 6. FIG. 6 is a front view of a part of the inverter 5 and the auxiliary battery 6. As mentioned above, the auxiliary battery 6 is fixed to the side member 95 by the metal fitting 15 and the rubber belt 31. The metal fitting 15 has a tip bent to configure the hook 15a. The auxiliary battery 6 is fixed by the rubber belt 31, which extends from the side member 95, being hung on the hook 15a.

As shown especially in FIG. 6, the protector 12p is located so as to overlap with the hook 15a as seen from the front of the vehicle (also see FIG. 2). Further, the hook 15a is located in front of the protector 12p and the power cables 22 are located behind the protector 12p. That is, the protector 12p is located between the hook 15a and the power cables 22 in the front and rear direction of the vehicle. When the vehicle rashes, an obstacle may collide with the auxiliary battery 6 and the auxiliary battery 6 may move backward. In that case, if there is no protector 12p, there is a risk that the hook 15a might move backward to the power cables 22 to break any of the power cables 22. The protector 12p, located between the hook 15a and the power cables 22, protects the power cables 22 from the hook 15a.

The hybrid vehicle 100 of the embodiment has the following features. The upper surface of the drive train 2 leans forward. The inverter 5 is fixed to the top of the drive train 2 with the gap G by the front bracket 12 and the rear bracket 13. The power cables 22 configured to supply the motors 3 and 4 with electric power extend to the upper surface of the drive train 2 from the side surface of the inverter 5 in the lateral direction of the vehicle. The inverter 5 is fixed to the upper surface of the drive train 2 in a forward-leaning position. The inverter 5 is fixed in the forward-leaning position with the gap G therebelow; therefore, when the forward part of the inverter 5 receives impact, the front bracket 12 and the rear bracket 13 deform and the inverter 5 sinks in the gap G while moving backward. In other words, when the hybrid vehicle 100 crashes, the front bracket 12 and the rear bracket 13 permit the inverter 5 to move slightly toward the drive train 2 so that any of the power cables 22 do not break. This alleviates the impact. Furthermore, since the inverter 5 sinks into the gap G, the distance between the inverter 5 and the drive train 2 becomes shorter. The possibility of any of the power cables 22 breaking is therefore low even if the vehicle crashes and an obstacle collides with the front surface of the inverter 5.

In the hybrid vehicle 100, the front bracket 12 has the wavy shape (portion indicated by the reference sign 12a in FIG. 3) between the fixing points on the drive train 2 side and the fixing points on the inverter 5 side as seen along the lateral direction of the vehicle. When the vehicle is in a crash and an obstacle collides with the front surface of the inverter 5, the wavy portion 12a stretches. This increases an amount of deformation of the front bracket 12, thus further alleviating the impact.

Further, the inverter 5 leans forward. Therefore, when an obstacle collides with the front surface of the inverter 5, the inverter 5 is highly likely to move toward the drive train 2. This also contributes to a break proof of any of the power cables 22.

The front bracket 12 and the front surface of the inverter 5 are fixed to each other by the bolts 25a, and the rear bracket 13 and the rear surface of the inverter 5 are fixed to each other by the bolts 25b. The bolts 25a and 25b extend substantially along the front and rear direction of the vehicle. More strictly, the bolts 25a and 25b extend at the same angle as the angle at which the inverter 5 leans. Such a structure reduces a possibility of great shearing force being applied to the bolts when the vehicle crashes. Therefore, a possibility of the bolts 25a and 25b breaking when the vehicle crashes is low. That is, a possibility of the front and rear brackets coming off at the time of the crash is low.

The power cables 22 configured to supply the motors 3 and 4 with electric power extend from the side surface in the lateral direction of the inverter 5. In order to protect the power cables 22, the protector 12p extends from a lateral side of the front bracket 12 into a space between the power cables 22 and the hook 15a at the tip of the metal fitting. The protector 12p and the tip (hook 15a) of the metal fitting fixing the auxiliary battery 6 overlap as seen from the front of the vehicle (see FIG. 6). If the metal fitting 15 moves backward together with the auxiliary battery 6 when the vehicle crashes, the tip (hook 15a) of the metal fitting may catch any of the power cables 22 and break any of the power cables 22. The protector 12p protects the power cables 22 from being broken by the hook 15a at the tip of the metal fitting. It should be noted that the protector 12p is a part of the front bracket 12.

The front bracket 12 has a wavy shape at a middle as seen along the lateral direction of the vehicle. The wavy portion (a region indicated by the reference sign 12a in FIG. 3) allows the inverter 5 to move in a longer distance at the time of impact. This also contributes to a reduction in the impact that is applied to the inverter 5.

Further, the power cables 22 extend from the side surface of the inverter 5 and are connected to the upper surface of the drive train 2. Such a structure also protects the power cables 22 from braking even in a case where the vehicle crashes and the inverter 5 moves.

The electric vehicle of the embodiment is a hybrid vehicle including a motor and an engine. The technology disclosed herein can also be applied to an electric vehicle including no engine. Further, the technology disclosed herein is also suitably applied to a fuel-cell vehicle. In that case, the main battery corresponds to a fuel cell.

Representative, non-limiting examples of the present invention have been described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric vehicle.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Specific examples of the present invention has been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. An electric vehicle comprising:
    a drive train provided in a front compartment of the vehicle, the drive train housing a traction motor; and
    an inverter configured to supply the motor with AC power, wherein:
    the inverter is fixed on a top of the drive train with a gap by a front bracket and a rear bracket,
    the front bracket connects a front surface of the inverter with the drive train, and
    the rear bracket connects a rear surface of the inverter with the drive train,
    a power cable configured to supply the motor with electric power extends from a side surface in a lateral direction of the inverter,
    a protector configured to protect the power cable extends from the front bracket to a front side of the power cable.

2. The electric vehicle according to claim 1, wherein the front bracket has a wavy shape between a fixing point on a drive train side and a fixing point on an inverter side as seen along a lateral direction of the vehicle.

3. The electric vehicle according to claim 2, wherein the front bracket and the front surface of the inverter, and the rear bracket and the rear surface of the inverter are fixed by bolts, the bolts extending along a front and rear direction of the vehicle.

4. The electric vehicle according to claim 3, further comprising:
    a battery provided in the front compartment,
    wherein a tip of a metal fitting, which fixes the battery, and the protector overlap as seen from a front of the vehicle.

5. The electric vehicle according to claim 2, further comprising:
    a battery provided in the front compartment,
    wherein a tip of a metal fitting, which fixes the battery, and the protector overlap as seen from a front of the vehicle.

6. The electric vehicle according to claim 1, wherein the front bracket and the front surface of the inverter, and the rear bracket and the rear surface of the inverter are fixed by bolts, the bolts extending along a front and rear direction of the vehicle.

7. The electric vehicle according to claim 6, further comprising:
    a battery provided in the front compartment,
    wherein a tip of a metal fitting, which fixes the battery, and the protector overlap as seen from a front of the vehicle.

8. The electric vehicle according to claim 1, further comprising:
    a battery provided in the front compartment,
    wherein a tip of a metal fitting, which fixes the battery, and the protector overlap as seen from a front of the vehicle.

* * * * *